(12) United States Patent
Huang

(10) Patent No.: US 9,981,427 B2
(45) Date of Patent: May 29, 2018

(54) SENSING DEVICE FOR THREE-DIMENSIONAL PRINTING OBJECT

(71) Applicants: XYZprinting, Inc., New Taipei (TW); Kinpo Electronics, Inc., New Taipei (TW); Cal-Comp Electronics & Communications Company Limited, New Taipei (TW)

(72) Inventor: Yao-Te Huang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 324 days.

(21) Appl. No.: 14/880,273

(22) Filed: Oct. 11, 2015

(65) Prior Publication Data
US 2017/0015067 A1    Jan. 19, 2017

(30) Foreign Application Priority Data
Jul. 14, 2015   (CN) .......................... 2015 1 0411128

(51) Int. Cl.
| | |
|---|---|
| *B29C 67/00* | (2017.01) |
| *B29C 59/04* | (2006.01) |
| *B33Y 50/00* | (2015.01) |
| *B33Y 40/00* | (2015.01) |
| *B29C 64/112* | (2017.01) |

(Continued)

(52) U.S. Cl.
CPC .......... *B29C 67/0088* (2013.01); *B29C 59/04* (2013.01); *B29C 64/112* (2017.08); *B29C 64/386* (2017.08); *B33Y 40/00* (2014.12); *B33Y 50/00* (2014.12); *B33Y 30/00* (2014.12)

(58) Field of Classification Search
CPC . B29C 67/0088; B29C 64/386; B29C 64/112; B29C 59/04; B33Y 40/00; B33Y 50/00; B33Y 30/00
See application file for complete search history.

(56) References Cited

U.S. PATENT DOCUMENTS

| | | | |
|---|---|---|---|
| 5,902,537 A | * 5/1999 | Almquist ................ | B29C 41/12 264/308 |
| 6,782,303 B1 | 8/2004 | Fong | |

(Continued)

FOREIGN PATENT DOCUMENTS

JP    2013067121    4/2013

OTHER PUBLICATIONS

"Search report of Europe Counterpart Application", dated Nov. 2, 2016, p. 1-p. 7.

*Primary Examiner* — Nahida Sultana
(74) *Attorney, Agent, or Firm* — JCIPRNET

(57) ABSTRACT

A sensing device of a three dimensional object being printed is provided. The sensing device includes a roller, a ring shape equipment, a sensor, and a processor. The roller is utilized to perform planarization of the 3D printing object. The ring shape equipment has the same axial as the roller and rotates with the roller. The sensor is utilized to detect rotational speed of the ring shape equipment. The processor determines whether the roller is in contact with the 3D printing object according to the rotational speed of the ring shape equipment. Thereby, contact between the roller and the 3D printing object may be determined without disposed sensor on the roller.

11 Claims, 3 Drawing Sheets

(51) Int. Cl.
*B29C 64/386* (2017.01)
*B33Y 30/00* (2015.01)

(56) References Cited

U.S. PATENT DOCUMENTS

| | | | | |
|---|---|---|---|---|
| 6,850,334 | B1 | 2/2005 | Gothait | |
| 8,876,513 | B2 * | 11/2014 | Lim | B29C 67/0059 |
| | | | | 264/497 |
| 8,888,480 | B2 * | 11/2014 | Yoo | B29C 67/0081 |
| | | | | 264/113 |
| 2001/0030383 | A1 * | 10/2001 | Swanson | B29C 41/36 |
| | | | | 264/308 |
| 2015/0273914 | A1 * | 10/2015 | Ruiz | B41J 2/0451 |
| | | | | 347/19 |
| 2017/0326800 | A1 * | 11/2017 | Moore | B29C 64/188 |
| 2017/0341295 | A1 * | 11/2017 | Ruiz | B41J 29/393 |

\* cited by examiner

SENSING DEVICE FOR THREE-DIMENSIONAL PRINTING OBJECT

CROSS-REFERENCE TO RELATED APPLICATION

This application claims the priority benefit of China patent application serial no. 201510411128.1, filed on Jul. 14, 2015. The entirety of the above-mentioned patent application is hereby incorporated by reference herein and made a part of the specification.

BACKGROUND

Technical Field

The disclosure is related to a three dimensional printing technique, and particularly to a sensing device utilized for sensing a cross section layer of a 3D printing object.

Background

Three-dimensional (3D) printing technology is considered as a Computer-Aided Manufacturing-shape (CAM), which is developed and utilized in industrial manufacturing-shape for rapidly producing 3D products. In general, the 3D printing is a series of design concepts of rapid prototyping (RP) technology. The principle of 3D printing is to form a cross-section of an object in X-Y plane via scanning and then stack each cross-section layer in a Z coordinate layer by layer, so as to manufacture a 3D printing object by a layer stacking means. Therefore, the 3D printing technology may be adapted for manufacturing-shape 3D printing objects having any geometric shape, and complex parts would demonstrate a more superior RP technology, and can significantly save manufacturing-shape time.

In the 3D printing technology, each 3D printer desires a height of each cross-section layer of the object dispensed by a printing head of the 3D printer would be the same after the solidification of the dispensed material, so that the subsequent cross-section layer may be dispensed based on prior layer. FIG. 1 is a schematic diagram illustrating a 3D printer. As illustrated in FIG. 1, a computer 110 is coupled to a 3D printer 100 and prints a cross-section layer 140 of a 3D model designed by the CAD software through a controller 120 and a printing head 130. Since material utilized by the 3D printer 100 is usually solid material which cures from fluid state, and the ink droplets formed by the material in fluid state have surface strain between each other, micro gaps would occur between the dispensed materials. In addition, dispensing rate, printing rate, and other problems may occur due to the ambient temperature while dispensing of the material by the printing head 130, which presents a difficulty for the each cross-section layer 140 of the object to be planar having a predetermined height H. As a result, the surface of the printed object may be recessed and not flat after stacking of a plurality of cross-section layer of the object.

Thus, there is a roller 150 (also referred as a planarizer) in the 3D printer 100 to flatten the cross-section layer of the object 140. However, the height of each cross-section layer 140 may be different. The 3D printer 100 has to learn when or at which height would the roller 150 contact the cross-section layer 140, so as to perform a planarization process. Thus, how to detect when the roller 150 contacts the cross-section layer 140 of the object is one of the difficulties in the 3D printing technology faces.

SUMMARY

The present disclosure provides a sensing device of a three dimensional (3D) object being printed, which learns whether a roller is in contact with the 3D printing object through a ring shape equipment having the same axial as the roller, so as to perform a planarization to a cross-section surface of the 3D printing object.

According to an exemplary embodiment of the disclosure, a sensing device for a three dimensional (3D) object includes a roller, a ring shape equipment, a sensor, and a processor. The roller is configured to perform a planarization process of the 3D printing object. The ring shape equipment is configured to have the same axial as the roller and rotate with the roller. The sensor is configured to detect a rotational period of the ring shape equipment. The processor is coupled to the sensor. The processor determines whether the roller is in contact with the 3D printing object according to the rotational period of the ring shape equipment.

According to an exemplary embodiment of the disclosure, a sensing device for a 3D printing object includes a roller, a driver, a transmission mechanism, a ring shape equipment, a sensor, and a processor. The roller is configured to perform a planarization process to the 3D printing object. The transmission mechanism is coupled between the driver and the roller, and the driver rotates the roller through the transmission mechanism. The ring shape equipment and the roller rotate together. The sensor is configured to detect a rotational speed of the ring shape equipment. The processor determines whether the roller is in contact with the 3D printing object according to the rotational speed of the ring shape equipment.

Based on the above, the exemplary 3D printing device and its sensing device learns whether the roller is in contact with the 3D printing object as to perform a planarization process to the 3D printing object by disposing a ring shape equipment that is disposed on the same axial as a roller (as known as a planazier), or by rotating the ring shape equipment through a transmission mechanism, where a sensor is utilized to detect a rotational status of the ring shape equipment. As a result, the contact between the roller and the 3D printing object may be learned without disposing a sensor on the roller.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
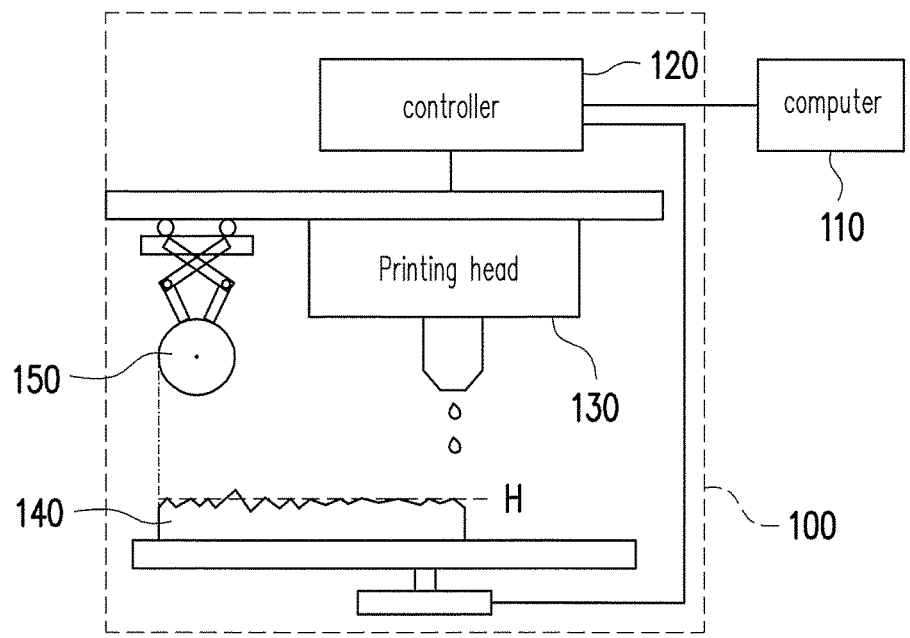
FIG. 1 is a schematic diagram illustrating a 3D printer.

Reference will now be made in detail to the exemplary embodiments of the invention, examples of which are illustrated in the accompanying drawings. Wherever possible, the same reference numbers are used in the drawings and the description to refer to the same or like parts.

For a 3D printing equipment, in order to learn when a planarizer utilized for flatting a 3D printing object contacts a cross-section layer of an object, one of the exemplary embodiment of the disclosure disposes a ring-shape equipment rotating with the roller (i.e., the planarizer) in a 3D printer, where the exemplary 3D printer detects the rotation of the ring-shape equipment by utilizing a sensor. In the exemplary embodiment, the ring-shape equipment may be configured to rotate with the planarizer by disposing the ring-shape equipment on the same axial as the planarizer or through other transmission mechanism. When the roller contacts a cross-section layer of a 3D printing object, the rotational speed of a driver (e.g., a direct-current motor) utilized to drive the roller may be reduce due to the friction, and at the same time, the rotational speed of the ring-shape equipment is also reduced. Thus, the 3D printer may learn whether the roller is in contact with the 3D printing object by detecting the rotational speed of the ring shape equipment, so as to perform the planarization process to the cross-section layer of the 3D printing object. As a result, it is not necessitated to dispose a sensor on the roller. Instead, a state where the roller contacts the 3D printing object may be learn through the rotational speed of the ring-shape equipment. In the following, various exemplary embodiments are illustrated to demonstrate the spirit of the present disclosure.

Figure 2:
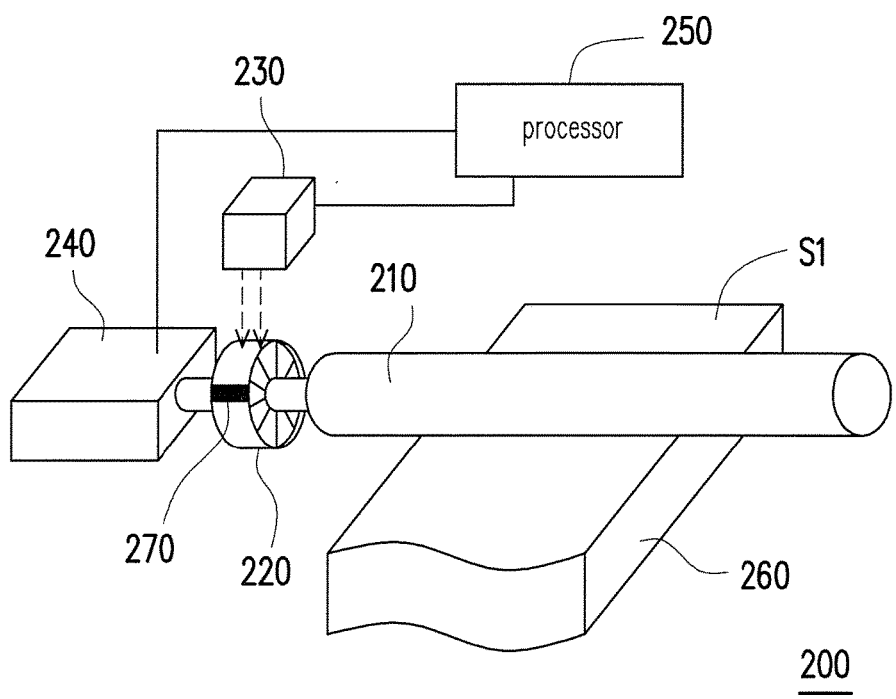
FIG. 2 is a schematic diagram illustrating a sensing device 200 utilized for constructing a 3D printing object by layers according to one of the exemplary embodiments of the disclosure.

FIG. 2 is a schematic diagram illustrating a sensing device 200 utilized for constructing a 3D printing object layer by layer according to one of the exemplary embodiments of the disclosure. The sensing device 200 is, for example, a 3D printer using a fused deposition modeling (FDM) technique, which prints a 3D printing object 260 layer by layer through a 3D model designed via CAD. The sensing device 200 may include a roller 210, a ring-shape equipment 220, a sensor 230, and a processor 250. The sensing device 200 may further includes a driver 240 utilized to drive the roller 210 and the ring-shape equipment 220 to rotate. In the exemplary embodiment, the 3D printer may adjust the overall height of the sensing device 200 through a power mechanism, so that the roller 210 may perform a planarization process to the 3D printing object 260.

The roller 210 may be controlled by the processor 250 to perform the planarization process of a surface S1 of the 3D printing object 260. The ring-shape equipment 220 and the roller 210 may be disposed on the same axial and configured to rotate together by the driver 240. In the exemplary embodiment, the ring-shape equipment 220 is, for example, a cylindrical shape using the axial as the center of the circle, and the radius of the ring shape equipment 220 relative to the axial is greater than the radius of the roller 210 relative to the axial, so as to better measure the rotational speed of the ring shape equipment 220. The ring shape equipment 220 may be referred to as an axial ring formed by plastic or other materials. The exemplary embodiment of the disclosure is not intended to limit the material or the shape of the equipment, as long as the sensor 230 may detect the rotational speed of the ring equipment 220, the material or shape of the ring shape equipment may be adjusted according to the design requirement. In the exemplary embodiment, the rotational speed of the ring shape equipment 220 may be represented by the angular rotational speed, rotational frequency, or rotational period.

Figure 3:
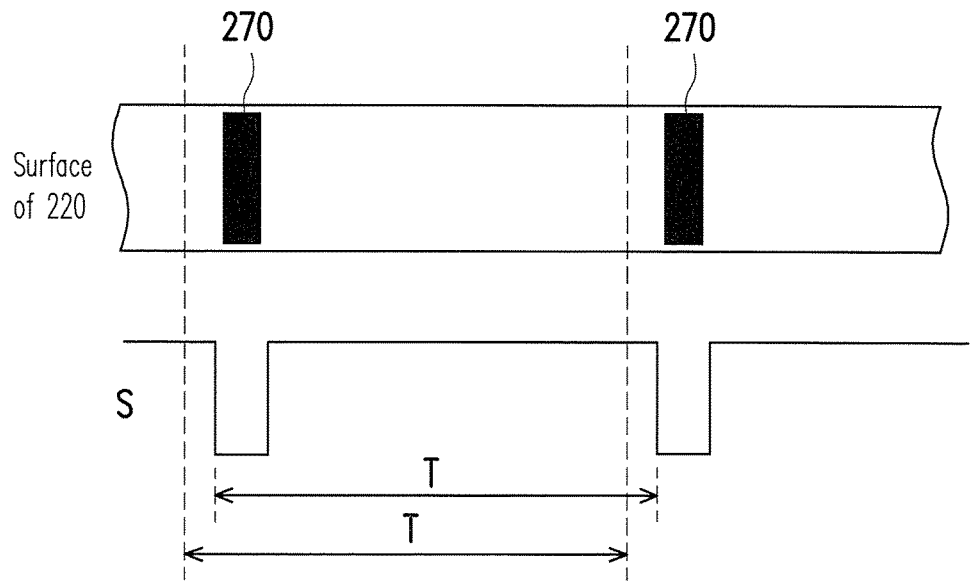
FIG. 3 is a waveform of a detected signal S.

In the exemplary embodiment, the sensor 230 may be an infrared reflective sensor. The ring shape equipment 220 may include a periodical indicator 230 (also referred to as an encoder strip). The periodical indicator 270 may be a black solid segment disposed on a surface of the ring shape equipment 220. In other words, the infrared reflective sensor 230 continuously emits infrared to the surface of the ring shape equipment, and then detects the reflected infrared (i.e., whether the emitted infrared is reflected). In the exemplary embodiment, the surface of the ring shape equipment 220 may reflect all or part of the infrared, however, the periodical indicator 270 disposed on the surface of the ring shape equipment 220 may absorb the infrared. As a result, when the ring shape equipment 220 rotates one revolution along with the roller 210, a waveform of detected signal S illustrated in FIG. 3 may be obtained. As illustrated in FIG. 3, when the infrared emitted by the infrared reflective sensor 230 encounters the periodical indicator 270, the infrared would be absorbed representing as a low level in teens of the detected signal S. When the infrared emitted by the infrared reflective sensor 230 encounters other part of surface other than the periodical indicator 270, the detected signal S would be in a high level. Thereby, through the detected signal S, the processor 250 may learn a rotational period T of the ring shape equipment 220.

The processor 250 may be at least coupled to the sensor 230 and the driver 240. The processor 250 may be hardware constructed by logical circuits, which executes the sensing method for the 3D printing object provided by the present disclosure. The processor 250 may also be programs or instructions stored in a storage media of the 3D printer 100, so as to execute the sensing method of the 3D printing object provided by the present disclosure. However, the disclosure is not intended to limit the implementation of the processor. In the exemplary embodiment, the processor 250 may be a central processor, FPGA or a multi-purpose chip programmed with program languages (instructions) for executing the corresponding functions. The driver 240 may be analog-type direct current motor. Those skilled in the art may utilize other types of motors as the driver 240 for rotating the roller 210 and the ring shape equipment 220.

Figure 4:
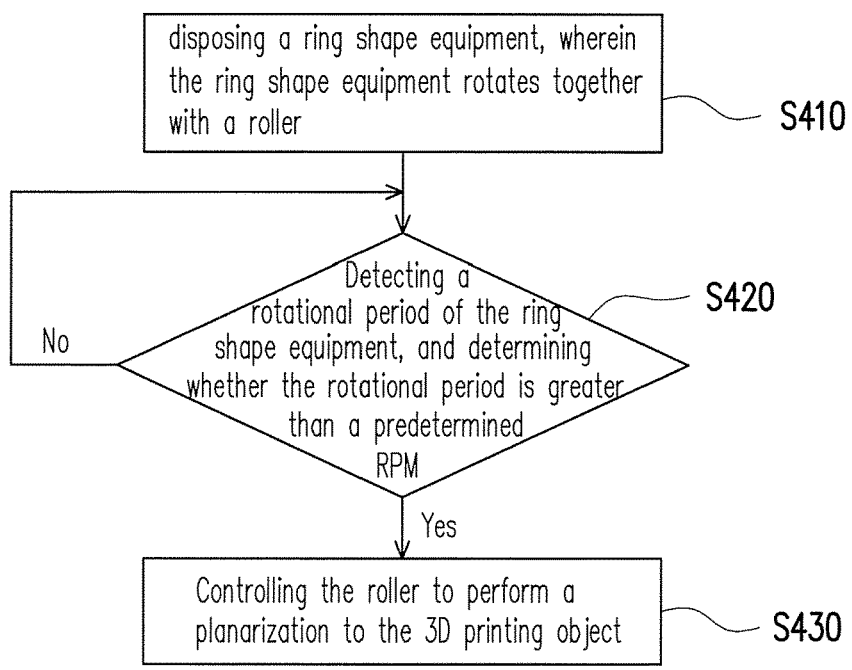
FIG. 4 is a flow diagram illustrating a method for sensing the 3D print object by layer according to an exemplary embodiment of the disclosure.

FIG. 4 is a flow diagram illustrating a method for sensing the 3D print object by layer according to an exemplary embodiment of the disclosure. The sensing method is adapted to the sensing device 200 illustrated in FIG. 2 and a 3D printer having the roller 210. With reference to FIGS. 2 and 4, in step 4, the sensing device 200 is configured to have a ring shape equipment 220. The ring shape equipment 220 and the roller 210 are disposed on the same axial, and therefore, the ring shape equipment 220 would rotate with the roller 210. Afterward, the sensor 230 may detect the rotational speed of the ring shape equipment 220 through the above periodical indicator 270, and the processor 250 may determine whether the roller 210 is in contact with the 3D printing object 260 according to the rotational speed of the ring shape equipment 220, so as to perform the planarization process to the 3D printing object. In detail, in step S420, the processor 250 detects the rotational period T of the ring shape equipment 220 through the sensor 230 and determines the rotational period is greater than a predetermined revolution per minute (RPM). The predetermined RPM may be represented by a constant duration. Theoretically, before the roller 210 is in contact with the 3D printing object 260, the driver 240 may rotate the roller 210 in high rotational speed (e.g., 1000 R.P.M) since there is no external friction. However, when the roller 210 is in contact with the 3D printing object 260 that is in the semi-fluid state, the driver 240 would not maintain the high rotational speed (e.g., 1000 R.P.M.) due to the friction. For example, the driver 240 may maintain 800 RPM when the roller is in contact with the 3D printing object 260 in the semi-fluid state. At this moment, the rotational period T detected by the sensor 230 may be greater than the predetermined RPM.

Therefore, when the rotational period T is not greater than the predetermined RPM, which represents that the roller 210 is not in contact with the 3D printing object 260, the processor 250 may repeatedly go through the "NO" path of the step S420 as to determine whether the rotational speed of the roller 210 is reduced through the detected signal S. On the contrary, when the rotational period T is greater than the predetermined RPM, which represents that the roller 210 is in contact with the 3D printing object 260 and the rotational speed of the roller 210 is reduced due to the increase of friction, the processor 250 then enters step S430 to control the roller 210 and the height of the roller to perform the planarization process to the surface S1 of the 3D printing object 260. The planarization process may be implemented in various different means based on the deposition material, technique, structure, etc. utilized by the 3D printer. For example, when the roller 210 is in contact with the 3D printing object 260, the height of the roller 210 or the platform carrying the 3D printing object 260 may be adjusted. The exemplary embodiment is not intended to limit the implementation of the planarization process.

Figure 5:
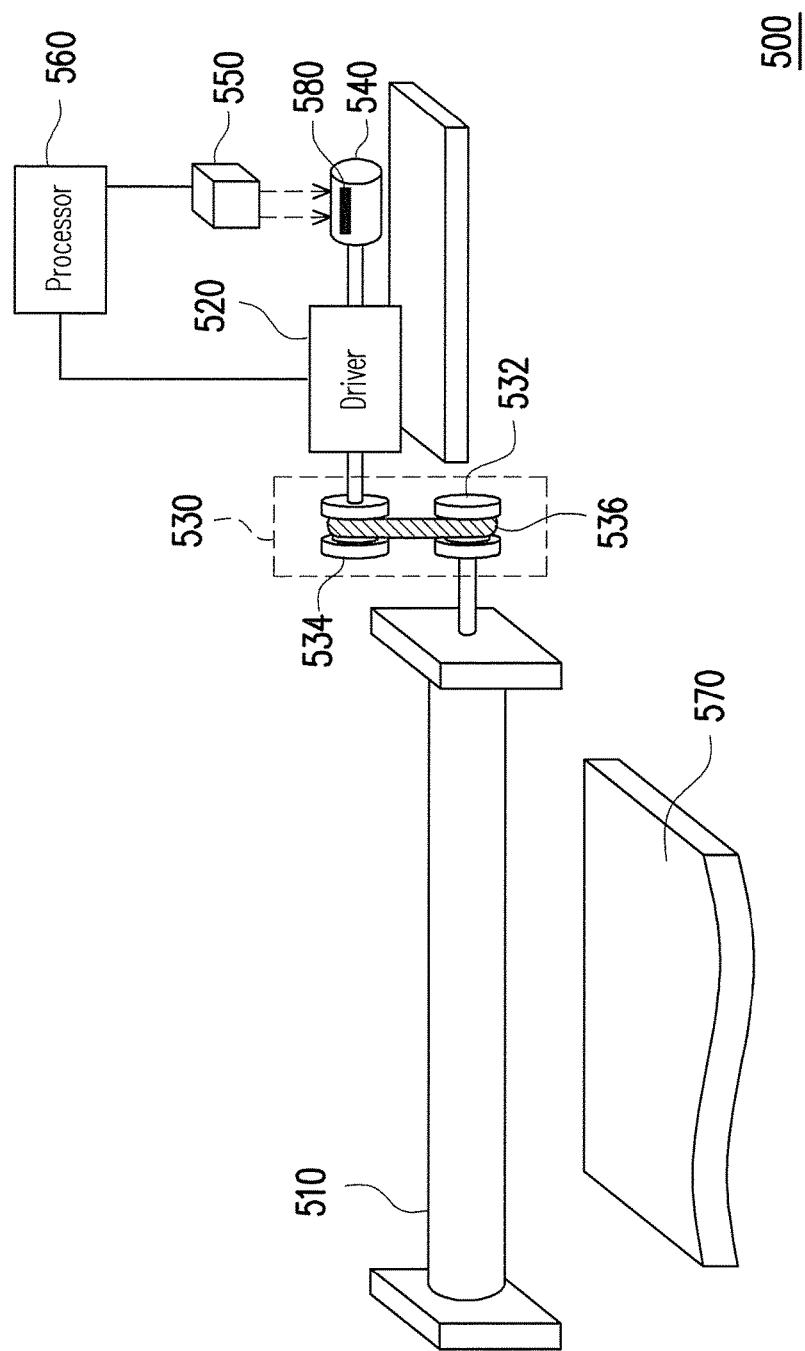
FIG. 5 is schematic diagram illustrating a sensing device 500 utilized for constructing a 3D printing object layer by layer according to other exemplary embodiment of the disclosure.

FIG. 5 is schematic diagram illustrating a sensing device 500 utilized for constructing a 3D printing object layer by layer according to other exemplary embodiment of the disclosure. The sensing device 500 is, for example, adapted to a 3D printer using FDM, which may be utilized to print a 3D printing object 570 layer by layer based on a 3D model file. The sensing device 500 includes a roller 510, a driver 520, a transmission mechanism 530, a ring shape equipment 540, a sensor 550, and a processor 560. In the exemplary embodiment, the roller 520, the driver 520, the sensor 550 and the processor 560 are similar to the roller 210, the driver 240, the sensor 230 and the processor 250 illustrated in FIG. 2, please refer to the above disclosure for detail description.

One of the major differences between the sensing device 200 and the sensing device 500 is that the sensing device 500 further includes the transmission mechanism 530 which is connected between the driver 530 and roller 510. Thereby, the driving force of the driver 520 may rotate the roller 510 through the transmission mechanism 530. In the exemplary embodiment, the transmission mechanism 530 includes two driving pulleys 532, 534 and a belt 536 coupled to the driving pulleys 532, 534. One end of the axial of the driver 520 is coupled to the driving pulley 534 of the transmission mechanism 530, and another end of the axial of the driver 520 is coupled to the ring shape equipment 540. Therefore, during the operation of the driver 520, the driver 520 may rotate the roller 510 and the ring shape equipment 540 through the transmission mechanism 520. In the exemplary embodiment, the distance (length) between the pulleys 532, 534 may be adjusted according to the design requirement, so as to adjust a ratio between the rotational speed of the roller 510 and the rotational speed of the ring shape equipment 540. Since there may be a ratio between the rotational speed of the roller 510 and the rotational speed of the ring shape equipment 540, the processor 560 may detect the rotational speed of the ring shape equipment 540 through the sensor 550 and determines whether the roller 510 is in contact with the 3D printing object 570 according to the rotational speed of the ring shape equipment 540, so as to control a distance between the roller 510 and the 3D printing object 570 to perform the planarization process to the 3D printing object 570.

In detail, the ring equipment 540 may include a periodical indicator 580. The periodical indicator 270 may be a black solid segment disposed on the surface of the ring shape equipment 220. The sensor 550 may be an infrared reflective sensor. The infrared reflective sensor may detect a rotational period of the ring shape equipment 550 according to the periodical indicator 580, so as to detect the rotational speed of the ring equipment 550. The sensing device 500 may be adapted for the method illustrated in FIG. 4, so as to perform steps S410-S430. Through the steps illustrated in FIG. 4, the processor 560 may detects the rotational status of the ring shape equipment through the sensor 550, so as to determine whether the roller 510 is in contact with the 3D printing object 570.

In summary, the 3D printing equipment and the sensing device thereof determines whether the roller (as referred to as planarizer) is in contact with the 3D printing object by disposing a ring shape equipment having the same axial as the roller and utilizing a sensor to detect a rotational status of the ring shape equipment. Accordingly, planarization process is performed on the 3D printing object through the roller. As a result, contact between the roller and the 3D printing object may be detected without disposing sensor on the roller.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A sensing device for a three dimensional (3D) object, comprising:
   a roller, configured to perform a planarization process of the 3D printing object;
   a ring shape equipment, having the same axial as the roller and rotating with the roller;
   a sensor, configured to detect a rotational speed of the ring shape equipment; and
   a processor, coupled to the sensor,
   wherein the processor determines whether the roller is in contact with the 3D printing object according to the rotational speed of the ring shape equipment.

2. The sensing device as claimed in claim 1, wherein the processor detects whether a rotational period of ring shape equipment is greater than a predetermine revolutions per minute (RPM), when the rotational period is greater than the predetermined RPM, the processor determines that the roller is in contact with the 3D printing object and controls the roller to have a distance relative to the 3D printing object as to perform the planarization process to the 3D printing object.

3. The sensing device as claimed in claim 1, wherein the ring shape equipment is a cylindrical shape with the axial as the center of the ring shape equipment, and the radius of the ring shape equipment relative to the axial is greater than the radius of the roller relative to the axial.

4. The sensing device as claimed in claim 1, wherein the ring shape equipment comprises a periodical indicator, wherein the periodical indicator is disposed on a surface of the ring shape equipment, and the sensor detects a rotational period of the ring shape equipment according to the periodical indicator.

5. The sensing device as claimed in claim 4, wherein the sensor is an infrared reflective sensor, the infrared reflective sensor emits infrared toward the ring shape equipment and senses whether the reflected infrared is received, wherein the surface of the ring shape equipment is utilized to reflect the infrared, and the periodical indicator disposed on the surface of the ring shape equipment absorbs the infrared.

6. The sensing device as claimed in claim 1, further comprising:
   a driver, coupled to the roller, and configured to rotate the roller.

7. The sensing device as claimed in claim 6, wherein the driver is a direct current motor.

8. A sensing device for a 3D printing object, comprising:
   a roller, configured to perform a planarization process to the 3D printing object;
   a driver and a transmission mechanism, wherein the transmission mechanism is coupled between the driver and the roller, the driver rotates the roller through the transmission mechanism;
   a ring shape equipment, coupled to the driver, wherein the ring shape equipment and the roller rotate together;
   a sensor, configured to detect a rotational speed of the ring shape equipment; and
   a processor, coupled to the sensor,
   wherein the processor determines whether the roller is in contact with the 3D printing object according to the rotational speed of the ring shape equipment.

9. The sensing device as claimed in claim 8, wherein the processor detects whether a rotational period of the ring shape equipment is greater than a predetermined RPM, when the rotational period of the ring shape equipment is greater than the predetermined RPM, the processor determines that the roller is in contact with the 3D printing object and controls the roller to have a distance relative to the 3D printing object, so as to perform the planarization process to the 3D printing object.

10. The sensing device as claimed in claim 8, wherein one end of an axial of the driver is coupled to the transmission mechanism, and another end of the axial of the driver is coupled to the ring shape equipment,
    wherein the transmission mechanism comprises:
        a first driving pulley, having the same axial as the roller;
        a second driving pulley, having the same axial as the driver; and
        a belt, configured to connected the first driving pulley and the second driving pulley together.

11. The sensing device as claimed in claim 8, wherein the ring shape equipment comprises a periodical indicator, the periodical indicator is disposed on a surface of the ring shape equipment, and the sensor detects a rotational period according to the periodical indicator,
    wherein the sensor is an infrared reflective sensor, the infrared reflective sensor emits infrared toward to ring shape equipment and detects whether the infrared is reflected and received, the surface of the ring shape equipment is utilized to reflect infrared and the periodical indicator disposed on the surface of the ring shape equipment absorbs the infrared.

* * * * *